United States Patent [19]

Kauer

[11] Patent Number: 5,685,561
[45] Date of Patent: Nov. 11, 1997

[54] THERMOPLASTIC AIR BAG COVER ASSEMBLY HAVING A SWITCH AND METHOD OF MAKING SAME

[75] Inventor: Hugh H. Kauer, Warren, Mich.

[73] Assignee: Larry J. Winget, Leonard, Mich.

[21] Appl. No.: 654,318

[22] Filed: May 28, 1996

[51] Int. Cl.[6] .................................................. B60R 21/16
[52] U.S. Cl. .................................. 280/731; 280/728.3
[58] Field of Search ................................. 280/731, 728.3

[56] References Cited

U.S. PATENT DOCUMENTS

| | | | |
|---|---|---|---|
| 3,461,014 | 8/1969 | James | 156/272.4 |
| 3,620,875 | 11/1971 | Guglielmo, Sr. | 156/272.4 |
| 3,620,876 | 11/1971 | Guglielmo, Sr. | 156/272.4 |
| 3,940,845 | 3/1976 | Czerwiak | 29/453 |
| 4,201,306 | 5/1980 | Dubois et al. | 220/4.05 |
| 4,578,424 | 3/1986 | Goel | 525/109 |
| 4,762,864 | 8/1988 | Goel et al. | 523/428 |
| 4,878,978 | 11/1989 | Goel et al. | 156/272.4 |
| 4,880,580 | 11/1989 | Bowers et al. | 264/486 |
| 4,934,735 | 6/1990 | Embach | 280/731 |
| 4,941,584 | 7/1990 | Bowers et al. | 220/601 |
| 5,062,661 | 11/1991 | Winget | 200/731 |
| 5,085,462 | 2/1992 | Gualtier | 280/731 |
| 5,186,490 | 2/1993 | Adams et al. | 280/731 |
| 5,265,905 | 11/1993 | Shelton | 280/731 |
| 5,308,106 | 5/1994 | Heidorn | 280/728.3 |
| 5,344,185 | 9/1994 | Cooke, II | 280/731 |
| 5,369,232 | 11/1994 | Leonelli | 200/61.51 |
| 5,399,819 | 3/1995 | Lang et al. | 280/731 |
| 5,449,197 | 9/1995 | Kerner | 280/731 |
| 5,465,998 | 11/1995 | Davis | 280/731 |
| 5,520,412 | 5/1996 | Davis | 280/731 |
| 5,542,694 | 8/1996 | Davis | 280/731 |

OTHER PUBLICATIONS

Emaweld, Electromagnetic Welding System for Assembling Thermoplastic Parts, a brochure published by Emabond Systems, Div. of Ashland Chemicals, copyright 1987.

*Primary Examiner*—Kenneth R. Rice

[57] ABSTRACT

A relatively flexible thermoplastic air bag cover assembly having a switch and method of manufacturing same is provided including a thermoplastic electromagnetic material which forms welds between front and back panels of the assembly. The welded front and back panels define a switch pocket therebetween to hold the switch such as a membrane-type horn switch therein. The welds occupy a relatively small amount of surface area yet provide strong polymer-to-polymer linkages between the front and back panels, thereby enlarging the effective switch activation area on the outer surface of the front panel. The welds are located very close to the switch pocket without damaging the switch during manufacturing. The bonds provided by the welds between the front and back panels are strong enough to prevent the switch from exiting the switch pocket during air bag deployment.

17 Claims, 2 Drawing Sheets

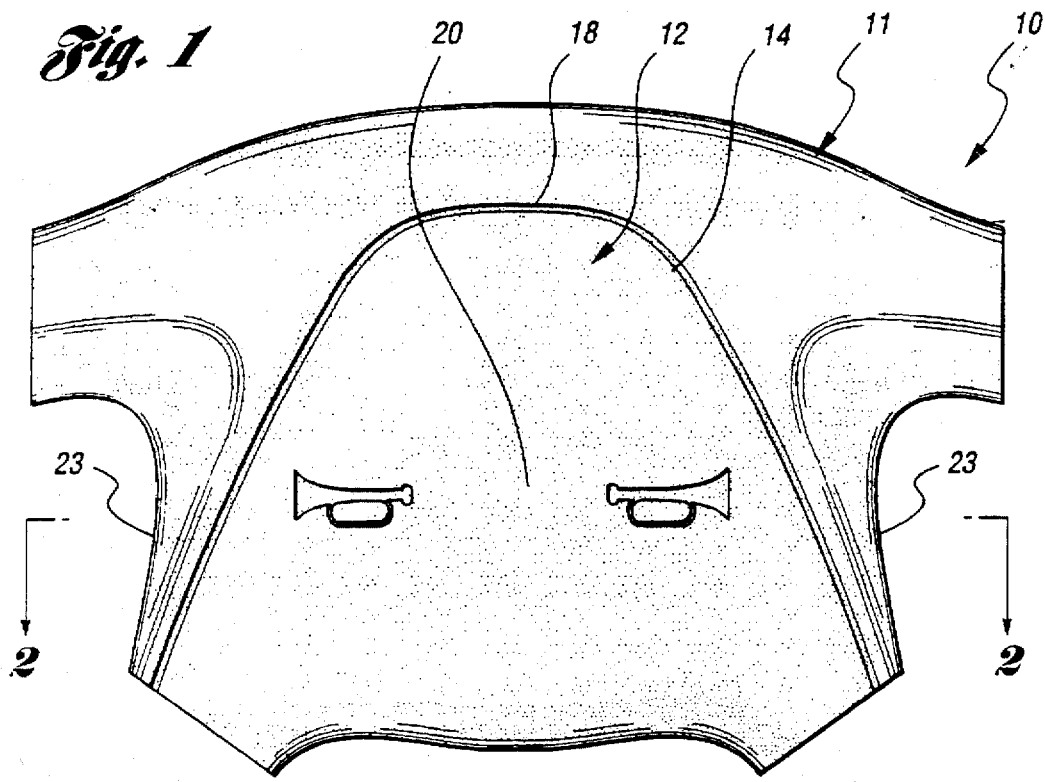
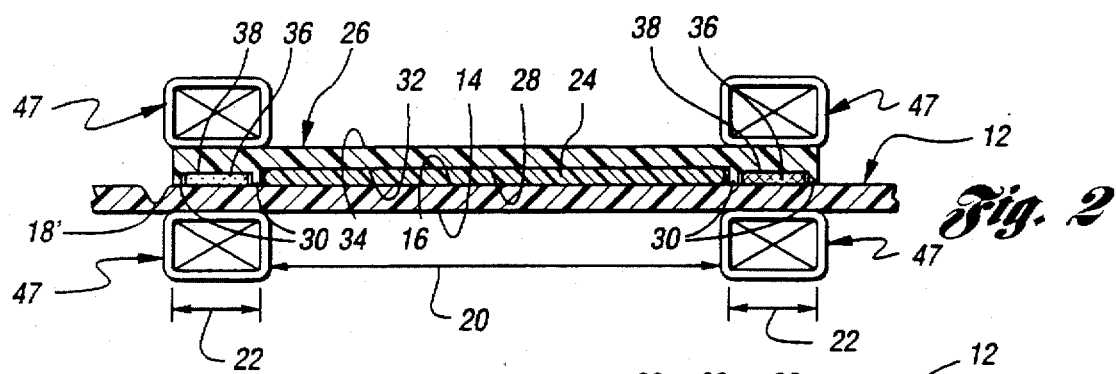
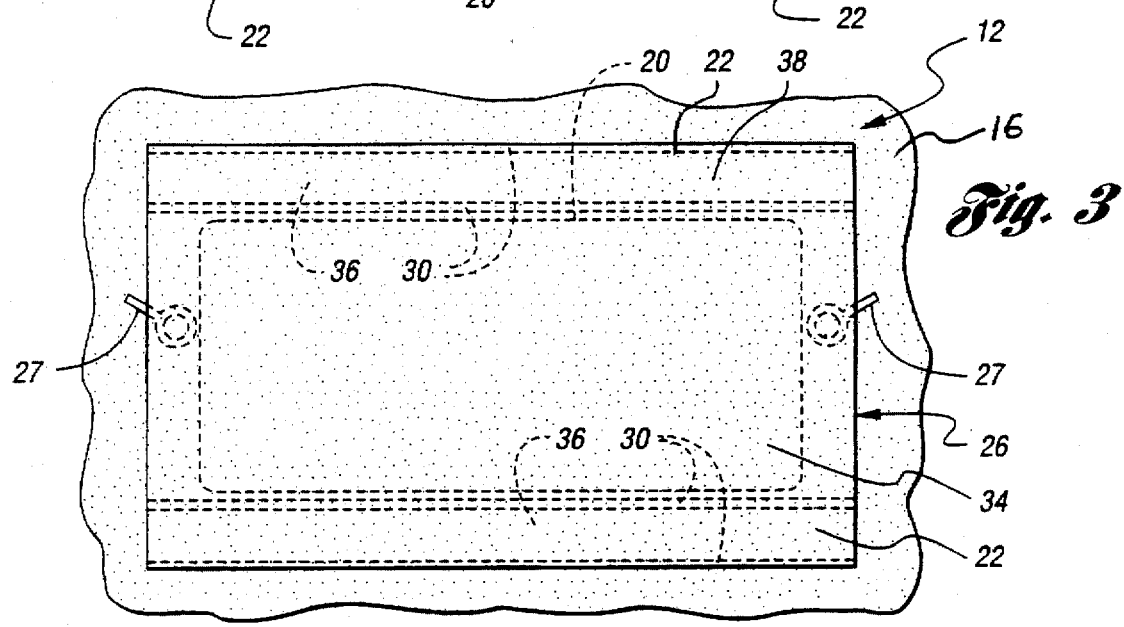

THERMOPLASTIC AIR BAG COVER ASSEMBLY HAVING A SWITCH AND METHOD OF MAKING SAME

TECHNICAL FIELD

This invention relates to thermoplastic air bag cover assemblies having switches therein and methods of making same.

BACKGROUND ART

Presently, when air bag covers are provided in automobiles on the driver's side of the vehicle, the air bag is stored in the steering column behind an air bag cover. During automatic inflation of the air bag, the air bag cover moves away from the steering column to permit its safety function between the steering column and the operator of the vehicle.

Recent practice in the automotive industry is utilization of all plastic fabricated air bag covers. Conventional air bag covers used in conjunction with occupant restraint systems often include various connection systems for attaching the air bag cover to the uninflated air bag container.

U.S. Pat. No. 5,085,462 issued to Gaultier discloses an air bag and vehicle horn switch assembly. Gaultier also discloses a conventional two piece cover construction.

U.S. Pat. No. 5,186,490 issued to Adams et al. discloses a cover for a inflatable restraint system for a motor vehicle which contains a slot in the upper wall thereof into which a replaceable thin or membrane-type switch assembly in inserted.

The Embach U.S. Pat. No. 4,934,735, discloses a device which has inner and outer covers or plates, each of which has split lines which separate the upper walls into upwardly and oppositely opening upper and lower pairs of flaps to permit deployment of the inflatable cushion. A switch assembly is located between either or both pair of flaps and includes one or more membrane switches located between the flaps and respective key pads projecting outwardly of the cover flap for closing respective pairs of circuits on the upper and lower flexible membranes of the membrane switch to each other.

The Heidorn U.S. Pat. No. 5,308,106, discloses an air bag module cover assembly with a switch subassembly removably attached at a front surface of the assembly.

The Winget U.S. Pat. No. 5,062,661, discloses a rigid plate attached to the substantially rigid remainder of a front panel of an air bag cover to define a hollow compartment which together move upon manual actuation of a flexible, manually operable diaphragm at the front surface of the front panel. The front panel has a first electrically conductive inner surface for making a circuit path with a corresponding second electrically conductive inner surface of the rigid plate.

The Cooke, II U.S. Pat. No. 5,344,185, discloses an air bag cover having a replaceable horn switch and a removable cover band.

The Leonelli U.S. Pat. No. 5,369,232 discloses a membrane horn blow switch integrated into the front panel of an air bag cover. More specifically, the membrane switch seats in and fills a horn actuation area which is a step-down portion of the cover reduced in thickness to approximately 1.0–2.0 mm. The portion of the cover occupied by the actuation area appears to be substantially less than 50% of the surface area of the front panel of the cover.

Some of the above switches are relatively small and oftentimes inaccessible for drivers who have large hands or for drivers who have limited manual dexterity. Also, many prior art air bag covers are formed contrary to good manufacturing practices.

The joining of thermoplastic materials is accomplished via a number of commercially accepted techniques. The advantages and disadvantages of each must be considered in determining the optimum technique for a specific application. All of the methods create fusion temperature at the abutting thermoplastic interface by the following methods:

sonics, vibration and spin welding develop mechanical friction by physically abraising two tightly held parts together;

hot plate requires direct application of the plastic surface to hot platens;

electromagnetic welding uses inductive energy to heat a special magnetically active weld material, which is located between the parts to be joined.

As described in the publication entitled EMAWELD®, dated 1987 by the Ashland Oil Company, electromagnetic welding uses the principles of inductive heating to create fusion temperatures within a joint area. To achieve this, a magnetically active material is formulated by compounding ferromagnetic particles within a thermoplastic matrix. This magnetically active material is placed at the joint interface and briefly exposed to an oscillating electromagnetic field developed by a set of conductive work coils through which a high frequency alternating current flows. Fusion temperature in the material is typically achieved within a matter of seconds causing the molten material to flow within the joint cavity. Heat generated within the material is transferred by conduction to the abutting part surfaces causing them to fuse at the joint interface. With electromagnetic welding, fusion temperatures are quickly and efficiently established within the joint without creating excessive induced stresses in the assembled parts.

The technique is fast, reliable and overcomes some of the inherent disadvantages of the other conventional bonding techniques.

U.S. Pat. No. 3,461,014 to James et al. discloses a magnetic induction method for heat-sealing and bonding predetermined sealing areas wherein ferro-magnetic particles are disposed in a thin, fusible plastic medium between the parts to be sealed.

U.S. Pat. No. 3,620,875 to Guglielmo, Sr. et al. discloses an electromagnetic adhesive and method of joining material thereby.

U.S. Pat. No. 3,620,876 to Guglielmo, Sr. et al. discloses a liquid electromagnetic adhesive and method of joining materials thereby.

U.S. Pat. No. 3,940,845 to Czerwiak discloses a method of manufacturing closure flanges using a thermoplastic bonding element having electromagnetic coating particles embedded therein for manufacturing closure flanges.

U.S. Pat. No. 4,201,306 to Dubois et al. discloses a variable capacity all-plastic drum.

U.S. Pat. No. 4,578,424 to Goel discloses high performance two-component epoxy structural adhesives with chemical thixotropy.

U.S. Pat. No. 4,762,864 to Goel et al. discloses a high performance induction curable two-component structural adhesive with non-sagging behavior.

U.S. Pat. No. 4,878,978 to Goel et al. discloses a bonding method employing high performance induction curable two-component structural adhesive with non-sagging behavior.

U.S. Pat. No. 4,880,580 to Bowers et al. discloses a reusable plastic drum container assembly and process for refitting such plastic drum container assembly.

U.S. Pat. No. 4,941,584 to Bowers et al. discloses a reusable plastic drum container assembly.

DISCLOSURE OF THE INVENTION

An object of the present invention is to provide an air bag cover assembly and method of making same wherein: (1) a switch incorporated therein is actuable over a relatively large surface area of a front panel of the assembly; (2) the switch won't be damaged during manufacture; and (3) the switch will remain within a pocket defined by a back panel and the front panel during deployment of an air bag covered by the front panel.

Another object of the present invention is to provide a thermoplastic air bag cover assembly having a switch and method of making same wherein: (1) the switch is actuable over a relatively large surface area of a front panel of the assembly; (2) the switch is not damaged during manufacture of the assembly; and (3) the assembly is not easily damaged during use.

In carrying out the above objects and other objects of the present invention, a thermoplastic air bag cover assembly constructed in accordance with the present invention is provided. The assembly includes a thermoplastic front panel having inner and outer surfaces and a thermoplastic back panel mounted on the inner surface of the front panel. The back panel also has inner and outer surfaces. The inner surfaces of the front and back panels define at least one channel and a switch pocket therebetween. A switch is disposed in the switch pocket so that pressure on the outer surface of the front panel actuates the switch. Finally, the assembly includes a weld disposed in the at least one channel. The weld is defined by a thermoplastic electromagnetic material which, when melted and placed under pressure, is caused to conform to the configuration of the at least one channel to bond and secure together surface layers of the front and back panels at the at least one channel by polymer-to-polymer linkages.

Further in carrying out the above objects and other objects of the present invention, a thermoplastic air bag cover assembly is provided. The assembly includes a thermoplastic front panel having inner and outer surfaces and a thermoplastic back panel mounted on the inner surface of the front panel. The back panel also has inner and outer surfaces. The inner surfaces of the front and back panels define first and second channels and a switch pocket between the channels. The assembly also includes a switch disposed in the switch pocket so that pressure on the outer surface of the front panel actuates the switch. Finally, the assembly includes a weld disposed within each of the channels. Each weld is defined by a thermoplastic electromagnetic material which, when melted and placed under pressure, is caused to conform to the configuration of its respective channel to bond to and secure together surface layers of the front and back panels at its respective channel by polymer-to-polymer linkages.

Still further in carrying out the above objects and other objects of the present invention, a method is provided for manufacturing a thermoplastic air bag cover assembly including a thermoplastic front panel, a thermoplastic back panel, and a switch. The method includes the step of positioning the front and back panels so that inner surfaces of the panels define at least one channel and a switch pocket therebetween. The method also includes the steps of positioning a thermoplastic electromagnetic material in the at least one channel and positioning the switch in the switch pocket. The method then includes the step of establishing an electromagnetic field about the positioned thermoplastic electromagnetic material for a time sufficient to melt the material to obtain molten material within the at least one channel. The molten material melts surface layers of the front and back panels defining the at least one channel. Then, the surface layers are forced together to cause the molten material to flow and be contained within the at least one channel. Finally, the method includes the step of allowing the molten material and the surface layers to cool. The molten material is fused with the surface layers to cause polymer-to-polymer linkages therebetween.

The advantages accruing to the air bag cover as constructed above are numerous. For example, a relatively small area is required to effectively bond the front and back panels together to thereby enlarge the effective area for activation of the switch. The at least one weld which bonds the front and back panels together can be located very close to the switch pocket without damaging the switch during manufacturing. Finally, the resulting bond between the front and back panels is strong enough to prevent the switch from exiting the switch pocket of the assembly during air bag deployment.

These and other features and additional objects of the invention will occur to those skilled in the art on reading the following description with reference to the accompanying drawings.

BRIEF DESCRIPTION OF THE DRAWINGS

FIG. 1 is a front elevational view of an air bag cover assembly constructed in accordance with the present invention;

FIG. 2 is an enlarged view, partially broken away and in cross-section, of the air bag cover assembly taken along lines 2—2 of FIG. 1 during manufacture of the assembly;

FIG. 3 is an enlarged rear view of the assembly of FIG. 1, partially broken away, and further illustrating a rear panel and its switch and weld areas.

BEST MODE FOR CARRYING OUT THE INVENTION

Figure 4:
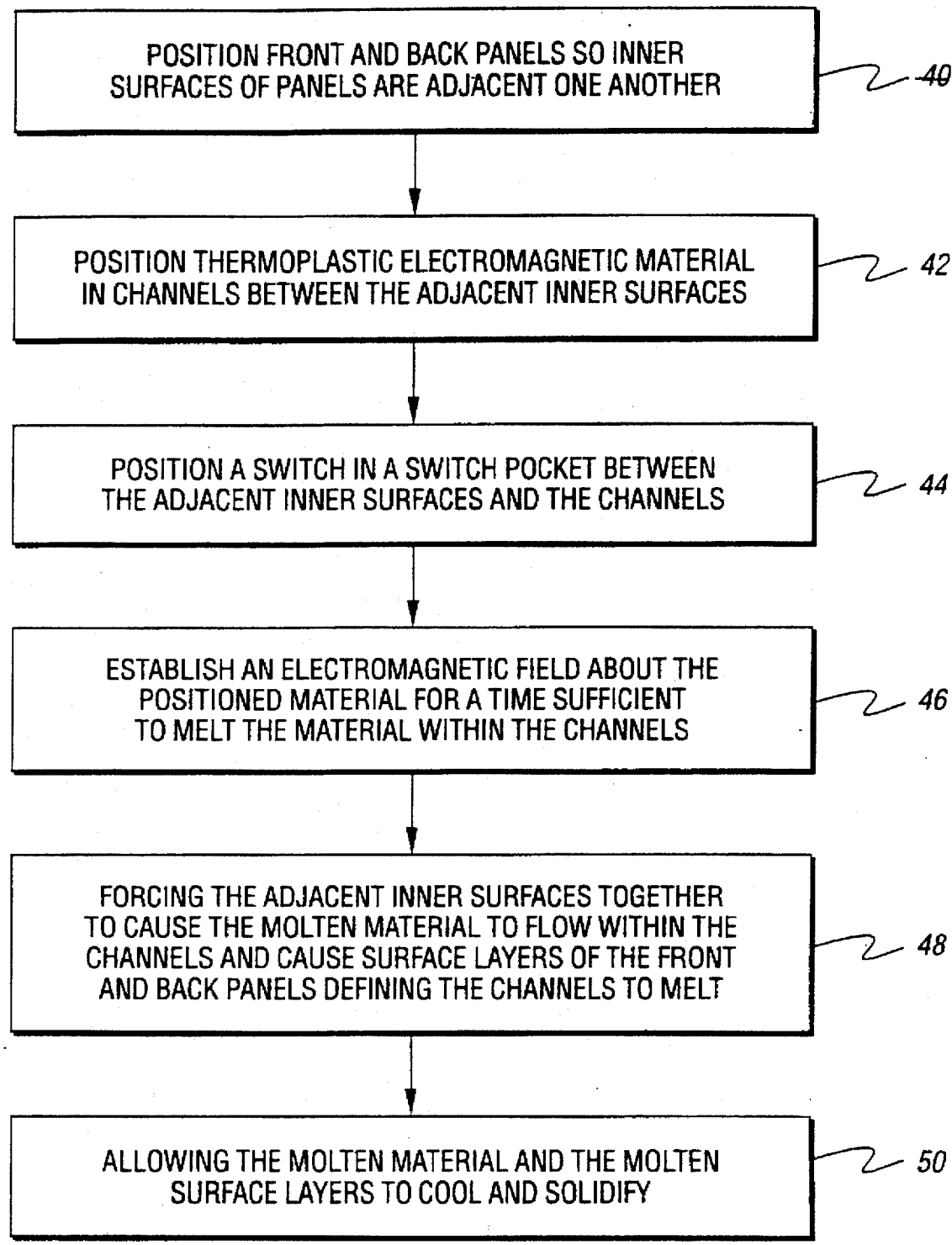
FIG. 4 is a block diagram flow chart illustrating the steps of the method of the present invention.

Referring now to the drawing Figures, there is illustrated in FIGS. 1–3 an automotive air bag cover assembly, generally indicated at 10, constructed in accordance with the present invention. Typically, the air bag cover assembly 10 is adapted to be secured at the top end of the vehicle drive column (not shown) at the steering wheel of the vehicle.

The air bag cover assembly 10 preferably includes a relatively flexible thermoplastic air bag cover, generally indicated at 11, formed by injection molding with a thermoplastic such as Santoprene® (a trademark of Monsanto Company) or Hytrel® (a trademark of Dupont).

The air bag cover 11 includes a front panel, generally indicated at 12, overlying an undeployed air bag (not shown). The front panel 12 has a front outer surface 14 and a rear inner surface 16.

The front panel 12 is separable along a prescribed tear pattern 18 upon deployment of the air bag. Alternatively, the tear pattern may be hidden when viewing the assembly 10 from the front surface 14 as indicated at 18' in FIG. 2.

The front panel 12 includes a horn switch activation area 20 and a weld or border area 22 which extends about the activation area 20. The border area 22 is shown in FIG. 3 as bordering the activation area 20 on two sides but may border the activation area 20 on more than two sides thereof.

Curved side walls 23 of the air bag cover 11 extend rearwardly from the front panel 12 as shown in FIG. 1.

The air bag cover assembly 10 also includes a switch such as a membrane-type or foil switch, schematically illustrated at 24 in FIG. 2, which lies behind the rear inner surface 16 of the front panel 12 in the switch activation area 20. The switch 24 includes electrical leads 27 adapted to be connected to the vehicle's electrical system as shown in FIG. 3.

The air bag cover assembly 10 also includes a plastic back panel or plate, generally indicated at 26 in FIGS. 2 and 3. The back panel 26 is mounted to the front panel 12 by being bonded to the rear inner surface 16 of the front panel 12 in containing relation to the switch 24 to form a hollow switch area or pocket 28 for the switch 24. The plastic of the back panel 26 is compatible with the thermoplastic of the front panel 12 and may comprise a stiffer polyester such as Bexloy.

The border area 22 is bound by integrally formed ribs or members 30 extending from an inner surface 32 of the back panel 26 and contacting the inner surface 18 of the front panel 12. An outer surface 34 of the back panel 26 is shown in FIG. 3.

Free end portions of the members 30 are disposed immediately adjacent the inner surface 16 of the front panel 12 to define closed channels 36 in which welds 38 in the form of thermoplastic electromagnetic material are located to bond the front and back panels 12 and 26, respectively, together.

The inner member of the members 30 may have a width as small as 0.7 to 1.0 millimeters, and the width of each channel 36 is relatively small (on the order of 4-6 millimeters). Consequently, only relatively small amounts of surface area of the front and back panels 12 and 26, respectively, are utilized to secure the back plate 26 to the front panel 12, and the switch 24 may be activated over a relatively large outer surface area of the front panel 12.

Referring now to FIG. 4, there are illustrated, in block diagram flow chart form, steps for carrying out a method for manufacturing the air bag cover assembly 10 of the present invention.

At block 40, the front and back panels 12 and 26, respectively, are positioned so that their inner surfaces 16 and 28, respectively, are adjacent one another. In this position, the channels 36 and the switch pocket 28 are formed.

At block 42, strips of a thermoplastic electromagnetic material, such as an EMAWELD® material, are positioned in the channels 36 between the spaced members 30. Preferably, the material is positioned between the ribs 30 prior to the step of block 40.

At block 44, a switch such as the foil switch 24, is positioned in the switch pocket 24 which is separated from the adjacent channels 36 by an inner member of the members 30. Preferably, the foil switch 24 is apertured so that the foil switch 24 is positioned over locating members (not shown) projecting from the inner surface 16 of the front panel 12 prior to the step of block 40.

At block 46, an electromagnetic field is established about the material positioned in the channels 36 for a time sufficient to melt the material within the channels 36. The molten material, in turn, melts surface layers of the front and back panels 12 and 26 which contact the molten material. As illustrated in FIG. 2, this step can be accomplished by controllably energizing electromagnetic transmission coils 47 coupled to an induction generator (not shown), such as an induction generator generally available from Emabond® Systems, a division of Ashland Chemical Company, of Norwood, N.J.

At block 48, the adjacent inner surfaces 16 and 32 are forced together such as by urging corresponding pairs of the work coils 47 together to cause the molten material to flow within the channels 36 and further cause surface layers of the front and back panels 12 and 26 defining the channels 36 to melt.

At block 50, the molten material and the molten surface layers defining the channels 36 are allowed to cool and solidify. In this way, the material fuses with the front and back panels 12 and 26, causing polymer-to-polymer linkages. This provides an extremely strong bond considering the relatively small surface area by which the back panel 26 is secured to the front panel 12.

In this way, the welds 38 formed by the thermoplastic electromagnetic material provide a very strong yet narrow bond between the front and back panels 12 and 26, respectively. These welds 38 can be located very close to the foil switch 24 in its switch pocket 28 without damaging the foil switch 24 during manufacturing. The bonds between the front and back panels 12 and 24, even though occupying a relatively small amount of surface area, are strong enough to prevent the foil switch 24 from exiting its switch pocket 20 during air bag deployment. In other words, the back panel 24 remains bonded to the front panel 12 to maintain the switch pocket 28 during tearing of the front panel 12 along its tear seam 18 or 18'.

While the best mode for carrying out the invention has been described in detail, those familiar with the art to which this invention relates will recognize various alternative designs and embodiments for practicing the invention as defined by the following claims.

What is claimed is:

1. A thermoplastic air bag cover assembly comprising:

a thermoplastic front panel having inner and outer surfaces;

a thermoplastic back panel mounted on the inner surface of the front panel, the back panel also having inner and outer surfaces, the inner surfaces of the front and back panels defining at least one channel and a switch pocket therebetween;

a switch disposed in the switch pocket so that pressure on the outer surface of the front panel actuates the switch; and a weld disposed within the at least one channel and being defined by a thermoplastic electromagnetic material which, when melted and placed under pressure, is caused to conform to the configuration of the at least one channel to bond to and secure together surface layers of the front and back panels at the at least one channel by polymer-to-polymer linkages.

2. The assembly as claimed in claim 1 wherein the at least one channel and the switch pocket are at least partially defined by a first member extending from the inner surface of one of the panels to a position immediately adjacent the inner surface of the other panel and wherein the member prevents molten material from flowing from the at least one channel to the switch pocket.

3. The assembly as claimed in claim 2 wherein the at least one channel is at least partially defined by the first member and a second member spaced from the first member and wherein the first and second members contain the molten material to flow within the at least one channel.

4. The assembly as claimed in claim 1 wherein the switch is a membrane-type switch.

5. The assembly as claimed in claim 4 wherein the membrane-type switch is a horn switch.

6. The assembly as claimed in claim 1 wherein the thermoplastic of the front panel is compatible to be electromagnetically welded with the thermoplastic of the back panel.

7. The assembly as claimed in claim 6 wherein the front and back panels are polyester panels.

8. The assembly as claimed in claim 1 wherein the at least one channel is of a substantial rectangular shape in cross-section.

9. The assembly as claimed in claim 3 wherein the thermoplastic elastomeric material is formed by melting a strip of the thermoplastic electromagnetic material disposed within the at least one channel.

10. The assembly as claimed in claim 3 wherein the first and second members and the surface layers define the at least one channel bordering the switch pocket and wherein the at least one channel is closed to contain flow of molten thermoplastic electromagnetic material during mounting of the back panel on the inner surface of the front panel to prevent the molten thermoplastic electromagnetic material from contacting the switch in the switch pocket.

11. The assembly as claimed in claim 1 wherein the front panel includes a tear seam formed therein.

12. The assembly as claimed in claim 11 wherein the tear seam is positioned in non-overlapping fashion with the weld.

13. The assembly as claimed in claim 1 wherein the inner surfaces of the front and back panels define a pair of spaced channels and the switch pocket therebetween and wherein the assembly further comprises another weld, each of the welds being disposed in its respective channel.

14. A thermoplastic air bag cover assembly comprising:
    a thermoplastic front panel having inner and outer surfaces;
    a thermoplastic back panel mounted on the inner surface of the front panel, the back panel also having inner and outer surfaces, the inner surfaces of the front and back panels defining first and second channels and a switch pocket between the channels;
    a switch disposed in the switch pocket so that pressure on the outer surface of the front panel actuates the switch; and
    a weld disposed within each of the channels, each weld being defined by a thermoplastic electromagnetic material which, when melted and placed under pressure, is caused to conform to the configuration of its respective channel to bond to and secure together surface layers of the front and back panels at its respective channel by polymer-to-polymer linkages.

15. The assembly as claimed in claim 14 wherein one of the channels and the switch pocket are at least partially defined by a first member extending from the inner surface of one of the panels to a position immediately adjacent the inner surface of the other panel and wherein the first member prevents molten material from flowing from the one of the channels to the switch pocket.

16. The assembly as claimed in claim 15 wherein the one of the channels is at least partially defined by the first member and a second member spaced from the first member and wherein the first and second members contain the molten material to flow within the one of the channels.

17. A method of manufacturing a thermoplastic air bag cover assembly including a thermoplastic front panel, a thermoplastic back panel, and a switch, the method comprising the steps of:
    positioning the front and back panels so that inner surfaces of the panels define at least one channel and a switch pocket therebetween;
    positioning a thermoplastic electromagnetic material in the at least one channel;
    positioning the switch in the switch pocket;
    establishing a electromagnetic field about the positioned thermoplastic electromagnetic material for a time sufficient to melt the material to obtain molten material within the at least one channel, the molten material melting surface layers of the front and back panels defining the at least one channel;
    forcing the surface layers together to cause the molten material to flow and be contained within the at least one channel; and
    allowing the molten material and the surface layers to cool wherein the molten material is fused with the surface layers causing polymer-to-polymer linkages therebetween.

* * * * *